United States Patent [19]

Pepper et al.

[11] E Patent Number: Re. 33,089

[45] Reissued Date of Patent: Oct. 10, 1989

[54] POSITION SENSING AND INDICATING DEVICE

[76] Inventors: Robert B. Pepper, 55140 Calhoun St., Thermal, Calif. 92274; James A. Maples, 762 Allen Ct., Palo Alto, Calif. 94303

[21] Appl. No.: 42,351

[22] Filed: Apr. 24, 1987

Related U.S. Patent Documents

Reissue of:

[64] Patent No.: 4,514,817
Issued: Apr. 30, 1985
Appl. No.: 233,000
Filed: Feb. 10, 1981

U.S. Applications:

[63] Continuation-in-part of Ser. No. 18,411, Mar. 7, 1979, Pat. No. 4,270,171.

[51] Int. Cl.[4] ..... G06F 15/20; H05B 39/04

[52] U.S. Cl. ..... 364/480; 315/292; 338/119; 341/5

[58] Field of Search ..... 315/291, 292, 294, 295, 315/297, 312, 317, 318, 362; 340/712, 718, 365 C; 338/117, 118, 119, 176, 179, 196; 364/480, 481

[56] References Cited

U.S. PATENT DOCUMENTS

| | | | |
|---|---|---|---|
| 2,469,924 | 5/1949 | Kunz, Jr. | 338/119 |
| 2,541,359 | 2/1951 | Huck | 338/119 |
| 3,668,467 | 6/1972 | Isaac | 315/292 |
| 3,673,394 | 10/1973 | Blanchard | 315/316 |
| 3,706,914 | 12/1972 | Van Buren | 315/292 |
| 3,909,770 | 9/1975 | Oka et al. | 338/119 |
| 3,914,728 | 10/1975 | Nishioka et al. | 338/119 |
| 3,919,681 | 11/1975 | Nishioka et al. | 338/119 |
| 3,943,397 | 3/1976 | Yancey | 315/317 |
| 3,952,277 | 4/1976 | Nishioka et al. | 338/119 |
| 3,968,467 | 7/1976 | Lampen et al. | 338/119 |
| 4,005,381 | 1/1977 | Klug | 338/119 |
| 4,057,751 | 11/1977 | Bonsignore et al. | 315/316 |
| 4,112,429 | 9/1978 | Tsuha et al. | 340/756 |
| 4,121,204 | 10/1976 | Welch et al. | 340/712 |
| 4,204,204 | 5/1980 | Pitstick | 340/712 |
| 4,221,975 | 9/1980 | Ledniczki et al. | 340/356 C |
| 4,224,615 | 9/1980 | Penz | 340/712 |
| 4,240,011 | 12/1980 | Dinges et al. | 315/316 |
| 4,242,676 | 12/1980 | Piguet et al. | 340/718 |
| 4,270,171 | 5/1981 | Maples et al. | 364/480 |
| 4,302,011 | 11/1981 | Pepper | 340/365 C |

*Primary Examiner*—Parshotam S. Lall
*Assistant Examiner*—Kevin Teska
*Attorney, Agent, or Firm*—Owen, Wickersham & Erickson

[57] ABSTRACT

The position of the operator's finger or an actuating device on a transducing surface is used for controlling the level of utilization devices including theater lights controlled by an automated theater light control system. The transducing surface, which may be either an analog or a digital device, is elongated in shape and is immediately adjacent to an elongated display having individual light emitting devices to indicate the level of the utilization device being controlled. Circuitry connected to the transducing surface produces a first signal to indicate when an operator's finger or an actuating device is present on the transducing surface, and it produces a second signal to indicate the position of the operator's finger or the actuating device on the transducing surface. The second signal is supplied to the display, and the first and second signals are supplied to the utilization device.

27 Claims, 3 Drawing Sheets

POSITION SENSING AND INDICATING DEVICE

Matter enclosed in heavy brackets [ ] appears in the original patent but forms no part of this reissue specification; matter printed in italics indicates the additions made by reissue.

RELATED APPLICATION

This is a Continuation-in-Part of applicants' copending application Ser. No. 18,411, filed Mar. 7, 1979, now U.S. Pat. No. 4,270,171.

BACKGROUND OF THE INVENTION

1. Field of the Invention

This invention relates to devices for controlling and varying the level of theater lights and the like.

2. Description of the Prior Art

The brightness or level of theater lights at one time was controlled manually by adjusting individual rheostats or autotransformers for each light or bank of lights. As theatrical programs became more sophisticated, automated light control systems were developed to fade lights in or out according to a predetermined program or time sequence. However, because performances often vary depending on the performers, audience, etc., it was necessary to provide for manual override so the fades could be sped up or slowed down as the performance required.

Typical prior art automated lighting systems included a potentiometer for each light or bank of lights driven by a motor through a slip clutch. When the program called for fading a light the motor would be energized and turn the potentiometer at a constant rate. If the operator desired to change the rate, he simply took hold of the moving potentiometer knob and turned it faster or slower. This system had the disadvantages of being bulky, clumsy and unreliable due to the large number of mechanical components.

SUMMARY OF THE INVENTION

According to a preferred embodiment of the present invention, a device for controlling the level, the fade-in and fade-out of theater lights and the like can be made with a minimum of moving parts. The device, called a touchplane herein, has a flat, elongated transducing surface and a parallel array of visible display devices. The relative level of the light or other utilization device being controlled by the touchplane is indicated by the visible display. Typically one end of the touchplane surface represents 0% relative level; and the other end, 100%.

When an operator places his finger or an actuating device, such as a stylus, on the transducing surface, the position of the operator's finger or the actuating device is sensed by the touchplane and the level of the light being controlled is adjusted to correspond to the level represented by the position of the operator's finger or the actuating device. If the operator slides his finger or the actuating device along the transducing surface, the level of the light will vary accordingly; and this fact will also be indicated by the visible display.

The touchplane may be built in either analog or digital form, depending on the requirements of the utilization device. An analog embodiment includes a resistive network that has a variable impedance depending on the presence and position of the operator's finger or the actuating device. Circuitry is provided to detect this variable impedance and to produce an analog signal that is representative of the impedance and, hence, of the position of a finger or actuating device on the transducing surface. This analog signal may, in turn, be converted to a digital signal if desired.

A digital embodiment uses a linear array of switches that is connected to a digital scanner. The scanner determines when a switch in the array is closed and produces a signal indicating which switch has been closed, as well as the fact that the operator's finger or the actuating device is on the transducing surface.

A visible display for use with either of the embodiments discussed above may comprise a row of lights such as light emitting diodes (LED's) situated alongside the transducing surface. An LED is illuminated next to whatever portion of the transducing surface the operator's finger or the actuating device touches, and it stays illuminated after the finger or the actuating device is removed, to indicate the last position of the operator's finger or the actuating device and the current level of the light being controlled.

The touchplane is ideal for use in an automated theater light control system. Because the output of the touchplane is (or can be) digital, it can be interfaced easily with a digital computer used to control the lights. While the lights are under the control of the computer, in accordance with a program stored therein, the level of the lights can be indicated on the visible display of the touchplane assigned to a particular light. If the operator desires to change the rate of a fade, he simply places his finger or the actuating device on the transducing surface and the level of the light is then controlled by the position and movement of his finger or the actuating device rather than the program in the computer.

The touchplane also produces a separate signal, called "Finger Down" herein, to indicate the fact that an operator's finger or an actuating device has been placed on the transducing surface. When the touchplane is being used in an automated system, this Finger Down signal can be used to take a particular light out of the automatic control program as soon as the operator's finger or the actuating device touches the transducing surface, without having to use a separate control for this purpose.

An actuating device rather than the operator's finger can be used in applications where it may not be desirable for the operator to place his finger directly in contact with the transducing surface. As mentioned above, the actuating device can be a stylus. Alternatively, the actuating device can comprise a slider assembly which the operator touches with his finger and then moves along the transducing surface as desired.

Another advantage of the touchplane is that, since it can be a digital device, it can be assigned to control different lights as required by the operator. As compared with a potentiometer controlled by a motor through a slip clutch, the touchplane is much more compact, more reliable, more convenient to use and more in harmony with contemporary styling of theater light control panels.

DETAILED DESCRIPTION OF THE PREFERRED EMBODIMENT

Applicants' allowed, copending patent application Ser. No. 18,411, entitled POSITION SENSING AND INDICATING DEVICE, filed Mar. 7, 1979, now U.S. Pat. No. 4,270,171, is hereby incorporated by reference in its entirety.

Figure 1:
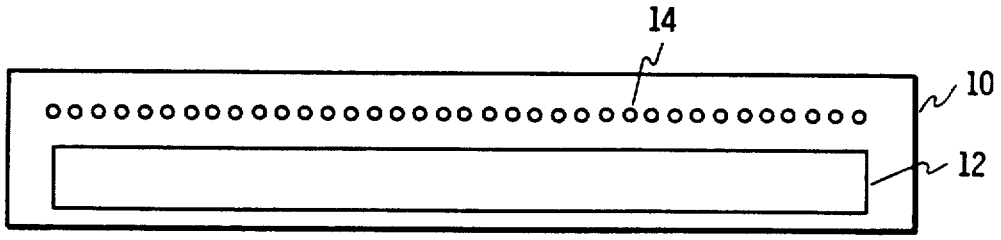
FIG. 1 shows a plane view of a touchplane according to a preferred embodiment of the present invention.

FIG. 1 shows a plan view of a preferred embodiment of the position sensing and indicating device 10 which, as mentioned above, will be referred to herein as a "touchplane". Touchplane 10 has an elongated transducing surface 12 that is described in greater detail in the referenced application. Alongside of transducing surface 12 is a row of visible indicators 14 such as light-emitting diodes.

Figure 2:
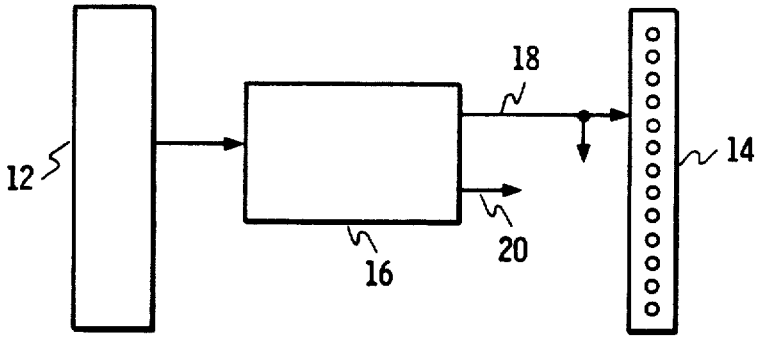
FIG. 2 shows a simplified block diagram of a touchplane according to a preferred embodiment of the present invention.

The simplified block diagram of FIG. 2 shows that transducing surface 12 is connected to a circuit 16 which produces an output signal on output 18 that indicates the position of an operator's finger or an actuating device on the transducing surface. Circuit 16 also produces an output signal on an output 20, called herein the "Finger Down" signal, to indicate the presence of an operator's finger or an actuating device on the transducing surface. In some cases it may be desirable to produce the Finger Down signal when the operator's finger or the actuating device is brought into the desired proximity to the operating surface. In such a case the signal on output 18 would indicate the position of the operator's finger or the actuating device once it had been brought into the desired proximity to the operating surface. Output 18 is connected to visible indicators 14 and is also available for connection to other utilization devices, as is more fully described in the referenced application. In response to the signal on output 18, one of the indicators will light up to show the position of the operator's finger or the actuating device. Circuit 16 may include a memory element to remember the last position of the operator's finger or the actuating device after the finger or actuating device has been removed, so that the corresponding indicator will remain illuminated until the operator places his finger or the actuating device on the transducing surface again in a different place.

Figure 3:
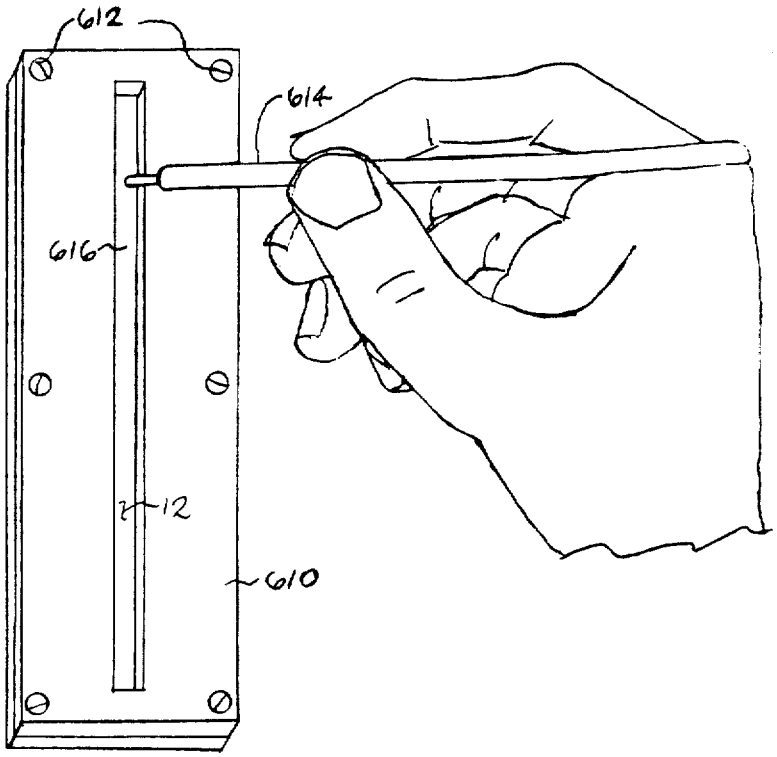
FIG. 3 shows a top view of a touchplane being actuated by a stylus.

FIG. 3 shows a touchplane with a bezel 610 fastened over transducing surface 12 with screws 612. A stylus 614 is inserted into a slot 616 in bezel 610 by the operator, and one end of the stylus makes contact with transducing surface 12. When contact is made with the transducing surface, a Finger Down signal will be produced on output 20, and the position of the stylus on the transducing surface will be indicated by the signal on output 18. As the operator moves the stylus in the slot along the transducing surface, the signal on output 18 will indicate the changing position of the stylus and the position will be shown on visible indicators 14. In some circumstances it may be desirable to make slot 616 narrow enough that only the stylus, not an operator's finger, can be brought into contact with transducing surface 12. In other instances it may be desirable to allow either the use of a stylus or an operator's finger.

Figure 4:
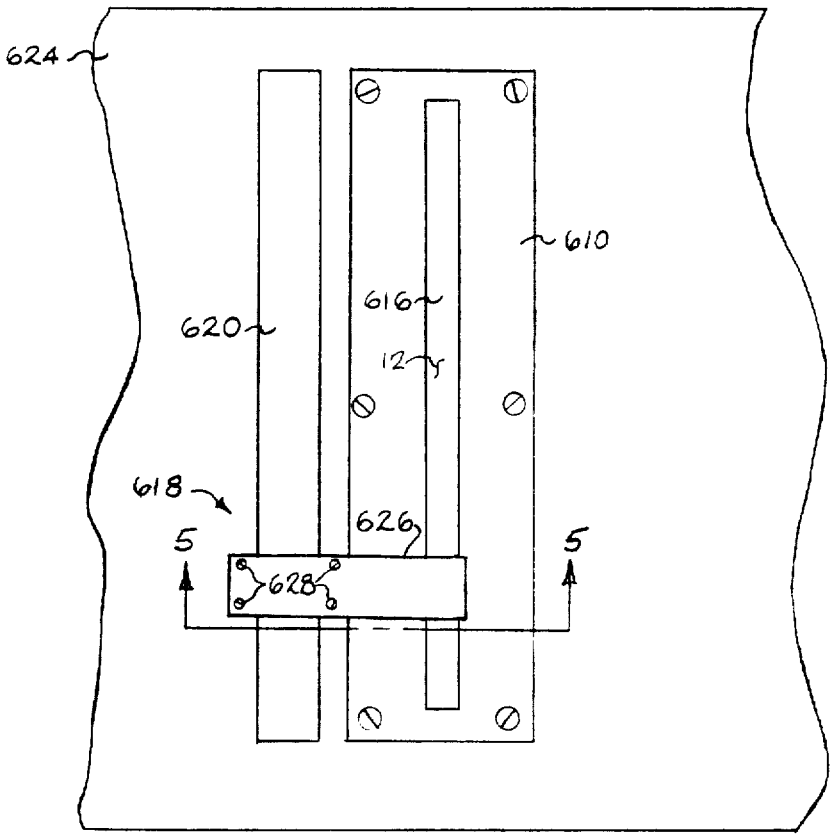
FIG. 4 shows a top view of a touchplane with a slider assembly.
Figure 5:
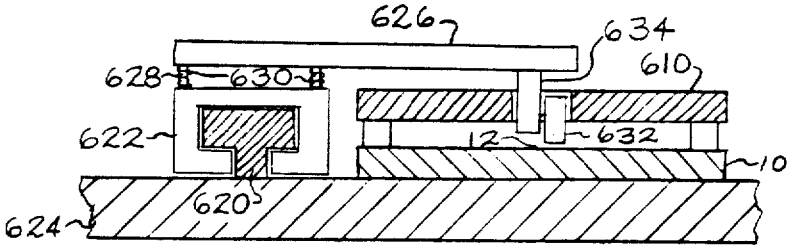
FIG. 5 shows a sectional view of the apparatus of FIG. 4.

FIGS. 4 and 5 show another actuating device in the form of a slider assembly 618 which may comprise a guide rail 620 that supports a slider 662. Guide rail 620 and touchplate 10 are both mounted to a panel 624 of a system such as a theater light control panel. An actuator plate 626 is supported by slider 622 on threaded pins 628 and springs 630. An actuating wheel 632 is rotatably mounted to a tab 634 on actuator plate 626. As in the embodiment of FIG. 3, bezel 610 is fastened over touchplane 10, and in this embodiment tab 634 and actuating wheel 632 project through slot 616.

Springs 630 hold actuating wheel 632 just out of contact with transducing surface 12 when no pressure is applied to the actuator plate 626. If an operator touches actuator plate 626, the pressure applied by his finger will compress the springs 630 and being actuating wheel into contact with transducing surface 12. When that happens, a Finger Down signal will be produced on output 20 and the output signal on output 18 will indicate the position of the actuating wheel on the transducing surface. The operator can slide the slider along the guide rail, and as he does so, the position of the actuating wheel will change on the transducing surface, thereby causing a change in the output signal on output 18. When the operator's finger is removed from the actuator plate, the Finger Down signal will be removed from output 20 and the signal on output 18 will remain at the value it had when the operator's finger was removed.

While the inventors' preferred means of accomplishing their invention has been disclosed, it will be appreciated by those skilled in the art that there are a number of possible variations within the scope of the invention. For example, a slider assembly may not required a separate guide rail; instead, the slider could simply be supported by the bezel and could slide in slot 616. Likewise, it may not be necessary for an actuating wheel or stylus to actually touch the transducing surface, it may be sufficient for some applications to bring the actuating device into a predetermined degree of proximity with the transducing surface if an array of proximity detectors is used for the transducing surface. One example of proximity detectors that could be used are Hall Effect magnetic field detectors that will detect the magnetic field produced by a small permanent magnet that could be mounted on the actuating end of stylus 614.

As is discussed in the referenced application, it should also be understood that for certain applications it may not be necessary for the visible indicators to be located immediately adjacent the touchplane. The visible indicator could be a cathode ray tube display showing the output level of one or more touchplanes that are located a distance away from the cathode ray tube.

We claim:

1. A [level] controlling device comprising:

position sensing transducer means having an elongated transducing surface for detecting the presence and position of an actuating device that is arbitrarily positionable by a user on the transducing surface independent of any previous position of the actuating device on the transducing surface, said detection being independent of the electrical properties of the human body; and circuit means connected to the transducer means for producing a fist signal representative of the fact that an actuating device is present at the transducing surface and a second signal representative of the position of the actuating device at the transducing surface for controlling [the level of] a utilization device.

2. A [level] controlling device as in claim 1 wherein the actuating device is a hand-held stylus.

3. A [level] controlling device as in claim 1 wherein the actuating device is a slider means mechanically coupled to the position sensing transducer for contacting the elongated transducing surface when touched by an operator and for sliding along the transducing surface when moved by an operator.

4. A [level] controlling device as in claim 2 or 3 wherein the position sensing transducer means comprises:

an elongated conductor on the transducing surface; and an elongated resistor on the transducing surface spaced from and parallel to the elongated conductor, and having a higher electrical resistance than the elongated conductor.

5. A [level] controlling device as in claim 2 or 3 wherein the position sensing transducer means comprises a linear array of switches.

6. A [level] controlling device as in claim 2 or 3 further comprising visible output means connected to the circuit means for producing a visible indication of the position of the actuating device on the transducing surface.

7. A [level] controlling device as in claim 6 wherein the visible output means has a longitudinal axis which is parallel with the longer dimension of the elongated transducing surface and the visual indication produced by the visible output means is aligned with the physical position of the actuating device on the transducing surface.

8. A position sensing device comprising:

an arbitrarily user positionable actuating device;

a transducer sensitive to the proximity and position of the actuating device independent of the electrical properties of the human body and independent of any previous position of the actuating device proximate to the transducer; and circuit means connected to the transducer for producing a first signal in response to the actuating device being brought into proximity with the transducer and for producing a second signal to indicate the position of the actuating device after it is brought into proximity with the transducer.

9. A position sensing device as in claim 8 wherein the actuating device comprises a hand-held stylus.

10. A position sensing device as in claim 8 wherein the actuating device comprises a slider assembly mechanically coupled to the transducer.

11. A position sensing device as in claim 9 or 10 wherein the transducer has a generally elongated shape and further comprising display means connected to the circuit means and having an elongated display surface located adjacent to and parallel with the transducer for displaying the position of the actuating device corresponding to the second signal.

12. A position sensing device as in claim 11 wherein the transducer has a plurality of discrete sensitive regions arranged in a linear array and the display means has a plurality of discrete display regions arranged in a linear array.

13. A position sensing device as in claim 11 wherein the transducer comprises:

an elongated conductor; and an elongated resistor spaced from and parallel to the elongated conductor, and having a higher electrical resistance than the elongated conductor.

14. A position sensing device comprising:

an arbitrarily user positionable actuating device; a transducer sensitive to the presence and position of the actuating device independent of the electrical properties of the human body and independent of any previous position of the actuating device on the transducer; and circuit means connected to the transducer for producing a first signal in response to the actuating device being brought into contact with the transducer and for producing a second signal to indicate the position of the actuating device on the transducer.

15. A position sensing device as in claim 14 wherein the actuating device comprises a hand-held stylus.

16. A position sensing device as in claim 14 wherein the actuating device comprises a slider assembly mechanically coupled to the transducer.

17. A position sensing device as in claim 15 or 16 wherein the transducer has a generally elongated shape and further comprising display means connected to the circuit means and having an elongated display surface located adjacent to and parallel with the transducer for displaying the position of the actuating device corresponding to the second signal.

18. A position sensing device as in claim 17 wherein the transducer has a plurality of discrete sensitive regions arranged in a linear array and the display means has a plurality of discrete display regions arranged in a linear array.

19. A position sensing device as in claim 17 wherein the transducer comprises:

an elongated conductor; and an elongated resistor spaced from and parallel to the elongated conductor, and having a higher electrical resistance than the elongated conductor.

20. In an automated control system having programmed control means for controlling [the level of] a utilization device connected thereto, a manual override control comprising:

display means connected to the programmed control means for displaying the current [level of the] utilization *of the* device under control;

an actuating device;

a control panel sensitive to the proximity and position of the actuating device;

circuit means connected to the display means and the control panel for detecting the proximity of the actuating device to the control panel for producing a first signal to cause the program control means to interrupt program control [of the level] of the utilization device, and for determining the position of the actuating device when it is brought into proximity with the control panel and producing a second signal to establish the [level of the] utilization device in response to the position of the actuating device.

21. A manual override control as in claim 20 wherein the actuating device is a hand-held stylus.

22. A manual override control as in claim 20 wherein the actuating device is a slider assembly mechanically coupled to the control panel.

23. A manual override control as in claim 21 or 22 wherein the control panel has a plurality of sensing areas arranged in a linear array and the display means has a plurality of display areas arranged in a linear array adjacent to and parallel with the sensing areas.

24. In an automated control system having programmed control means for controlling [the level of] a utilization device connected thereto, a manual override control comprising:

display means connected to the programmed control means for displaying the current [level of the] utilization *of the* device under control;

an actuating device;

a control panel sensitive to the presence and position of the actuating device;

circuit means connected to the display means and the control panel for detecting the presence of the actuating device on the control panel and for producing a first signal to cause the program control means to interrupt program control of the [level of the] utilization device, and for determining the position of the actuating device on the control panel and producing a second signal to establish the level of the utilization device in response to the position of the actuating device.

25. A manual override control as in claim 24 wherein the actuating device is a hand-held stylus.

26. A manual override control as in claim 24 wherein the actuating device is a slider assembly mechanically coupled to the control panel.

27. A manual override control as in claim 25 or 26 wherein the control panel has a plurality of sensing areas arranged in a linear array and the display means has a plurality of display areas arranged in a linear array adjacent to and parallel with the sensing areas.

* * * * *